United States Patent
Ahn et al.

(10) Patent No.: US 7,183,710 B2
(45) Date of Patent: Feb. 27, 2007

(54) PLASMA DISPLAY PANEL

(75) Inventors: Jeong-Chull Ahn, Suwon-si (KR); Seung-Hyun Son, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 48 days.

(21) Appl. No.: 10/992,768

(22) Filed: Nov. 22, 2004

(65) Prior Publication Data

US 2005/0212430 A1    Sep. 29, 2005

(30) Foreign Application Priority Data

Nov. 29, 2003   (KR) .................. 10-2003-0086131

(51) Int. Cl.
*H01J 17/49*    (2006.01)

(52) U.S. Cl. ...................... 313/587; 313/582

(58) Field of Classification Search ......... 313/582–587
See application file for complete search history.

(56) References Cited

U.S. PATENT DOCUMENTS

| | | | | |
|---|---|---|---|---|
| 5,977,708 A * | 11/1999 | Amatsu et al. | ............. | 313/586 |
| 6,346,775 B1 * | 2/2002 | Lee et al. | ................ | 315/169.3 |
| 6,376,986 B1 | 4/2002 | Takagi et al. | | |
| 6,384,531 B1 * | 5/2002 | Park et al. | .................. | 313/584 |
| 6,517,400 B1 * | 2/2003 | Cho et al. | ...................... | 445/24 |
| 6,621,215 B1 * | 9/2003 | Su et al. | ..................... | 313/582 |
| 6,624,591 B2 * | 9/2003 | Mori et al. | .............. | 315/169.3 |
| 6,747,409 B1 * | 6/2004 | Han et al. | ................... | 313/582 |
| 6,822,393 B2 * | 11/2004 | Kim | ............................ | 313/582 |
| 6,838,826 B2 * | 1/2005 | Lin et al. | ..................... | 313/582 |
| 6,906,689 B2 * | 6/2005 | Lee et al. | ...................... | 345/60 |
| 6,933,674 B2 * | 8/2005 | Im et al. | ...................... | 313/582 |
| 6,975,284 B1 * | 12/2005 | Kim et al. | ...................... | 345/60 |
| 2002/0047519 A1 * | 4/2002 | Kunii et al. | ................ | 313/584 |
| 2002/0084751 A1 | 7/2002 | Kim | | |

FOREIGN PATENT DOCUMENTS

| | | |
|---|---|---|
| JP | 2002298742 | 10/2002 |
| JP | 2003-157773 | 5/2003 |
| KR | 1020020055807 | 7/2002 |
| KR | 1020030037487 | 5/2003 |
| KR | 1020030081642 | 10/2003 |

\* cited by examiner

*Primary Examiner*—Mariceli Santiago
*Assistant Examiner*—Dalei Dong
(74) *Attorney, Agent, or Firm*—H.C. Park & Associates, PLC

(57) ABSTRACT

A plasma display panel with reinforcing electrodes arranged at both ends of discharge cells along a direction address electrodes are formed and coupled to display electrodes. The reinforcing electrodes may comprise carbon-based material such as carbon nanotubes or graphite, and they may be stacked in two or more layers and covered with a dielectric layer and a protective layer. The dielectric layer may be interposed between the reinforcing electrodes and the display electrodes. The dielectric layer may expose the reinforcing electrodes so that the protective layer covers the reinforcing electrodes. A portion of the protective layer corresponding to the reinforcing electrodes has a surface roughness of about 300 nm to about 700 nm.

5 Claims, 9 Drawing Sheets

PLASMA DISPLAY PANEL

CROSS REFERENCE TO RELATED APPLICATION

This application claims priority to and the benefit of Korean Patent Application No. 10-2003-0086131, filed on Nov. 29, 2003, which is hereby incorporated by reference for all purposes as if fully set forth herein.

BACKGROUND OF THE INVENTION

1. Field of the Invention

The present invention relates to a plasma display panel (PDP). More specifically, the present invention relates to a PDP having enhanced discharge efficiency.

2. Discussion of the Related Art

Flat panel display devices, including liquid crystal displays (LCDs), field emission displays (FEDs), PDPs, and organic electroluminescence display devices, have been recently developed to improve upon the larger and heavier cathode ray tubes (CRT).

Among these flat panel display devices, large PDPs, which display characters or images using plasma generated by gas discharge, may be easily manufactured. A typical three-electrode surface discharge alternating current (AC) PDP will now be explained with reference to FIG. 13, FIG. 14 and FIG. 15.

FIG. 13 shows a partial exploded perspective view of a conventional three-electrode surface discharge AC PDP, and FIG. 14 shows a partial cross-section view of the PDP of FIG. 13 after fabrication.

Address electrodes 3 are formed on a rear substrate 1, and display electrodes 15, consisting of scan electrodes 11 and sustain electrodes 13, are formed on a front substrate 9. The scan electrodes 11 and the sustain electrodes 13 may have transparent electrodes $11_a$, $13_a$, which may be formed with indium tin oxide (ITO) or other like substances. The transparent ITO electrodes transmit visible rays very well, and are evenly formed on a large-sized panel with excellent affinity with neighboring materials. However, because the transparent electrodes $11_a$, $13_a$ are highly resistant, metallic bus electrodes $11_b$, $13_b$ are formed on the ITO electrodes $11_a$, $13_a$ to enhance electrical conductivity.

A first dielectric layer 17 covers the address electrodes 3, and a second dielectric layer 19 covers the display electrodes 15. A protective layer 21, which is typically formed of magnesium oxide (MgO), may cover the second dielectric layer 19. The scan and sustain electrodes 11, 13 are arranged to cross the address electrodes 3. Barrier ribs 5, which may be formed in between and in parallel to the address electrodes 3, are formed on the first dielectric layer 17 to define and prevent cross talk between discharge cells.

An intersection of an address electrode 3 with a display electrode pair 15 defines a discharge cell, which may be filled with a discharge gas such as a Ne—Xe mixed gas.

With above-structured PDP, applying a driving voltage $V_a$ to the address electrodes 3 and the scanning electrodes 11 generates an address discharge between the electrodes, thereby forming wall charges within a discharge cell. At this time, (+) and (−) electric charges (wall charges) corresponding to a polarity of the scan or sustain electrodes 11, 13 are charged in the second dielectric layer 19. The wall charges may form a space voltage (wall voltage $V_w$) between the scan and sustain electrodes 11 and 13, which functions to select the discharge cells.

If a discharge sustain voltage $V_s$ is applied across a pair of scan and sustain electrodes 11, 13, it may be summed with the wall voltage $V_w$. When the total voltage ($V_s+V_w$) exceeds a firing voltage $V_f$, a sustain discharge is performed in the discharge cell, thereby exciting the discharge gas. The excited discharge gas generates ultraviolet rays, which in turn excite phosphor layers 7 to generate visible rays and display desired images.

Before an address period to select these discharge cells, a reset period may be performed to erase wall charges from a previous sustain discharge. Traditionally, in the reset period of a PDP, (+) charges accumulate on a portion of the first dielectric layer 17 corresponding to the address electrode 3, and (−) charges accumulate on a portion of the second dielectric layer 19 corresponding to the scan electrode 11. The charges may then be erased or set. As a result, an address discharge may be performed smoothly.

FIG. 14 and FIG. 15 show plasma discharge paths and wall charge distribution at sustain discharge in a discharge cell of a PDP operated as above.

Referring to FIG. 14, plasma discharges are generated in the gap G between the scan and sustain electrode 11, 13 to spread in the discharge cell. The discharge intensity decreases away from the gap G. Accordingly, discharge paths to emit vacuum ultraviolet rays may be limited to paths ①, ②, ③ of FIG. 14.

A conventional PDP may have low discharge efficiency due to a short sustain discharge path and because the discharge may be localized at the center portion of the gap G.

Also, referring to FIG. 15, the wall charge distribution curve, which shows wall charges charged on the second dielectric layer 19, has a minimum value at the gap G, and a maximum value at about 50 μm to about 100 μm from the gap G toward the scan and sustain electrodes 11, 13. That is, the charge distribution curve tends to reduce the amount of wall charge at the periphery of the gap G. With the above-structured conventional PDP, the wall discharge may be produced locally at the second dielectric layer 19. Therefore, the second dielectric layer 19 may not be used efficiently.

SUMMARY OF THE INVENTION

The present invention provides a PDP with enhanced discharge efficiency.

The present invention also provides a PDP that efficiently uses the dielectric layer covering display electrodes.

Additional features of the invention will be set forth in the description which follows, and in part will be apparent from the description, or may be learned by practice of the invention.

The present invention discloses a PDP including first and second substrates, address electrodes formed on the first substrate, and a pair of display electrodes formed in parallel to each other on the second substrate in a direction crossing the address electrodes. Discharge cells are formed by crossings of the address electrodes and the pair of display electrodes. First reinforcing electrodes are arranged at both ends of the discharge cells along a direction the address electrodes are formed. The first reinforcing electrodes are coupled to the display electrodes.

The present invention also discloses a PDP comprising a first substrate and a second substrate, address electrodes formed on the first substrate, barrier ribs arranged between the first substrate and the second substrate, and a pair of display electrodes formed in parallel to each other on the second substrate in a direction crossing the address electrodes. Reinforcing electrodes are arranged at both ends of a discharge cell along a direction the address electrodes are formed, and the reinforcing electrodes are coupled to the display electrodes. The barrier ribs define discharge cells and non-discharge regions, and a non-discharge region is surrounded by discharge cells.

The present invention also discloses a PDP comprising a first substrate and a second substrate, address electrodes formed on the first substrate, barrier ribs arranged between the first substrate and the second substrate, and a pair of display electrodes formed in parallel to each other on the second substrate in a direction crossing the address electrodes. Reinforcing electrodes are arranged at both ends of a discharge cell along a direction the address electrodes are formed, and the reinforcing electrodes are coupled to the display electrodes. The display electrodes comprise protrusion electrodes having a maximum width at a center of the discharge cell and a minimum width at both ends of the discharge cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

The following describes exemplary embodiments of the present invention with reference to the accompanying drawings.

Figure 1:
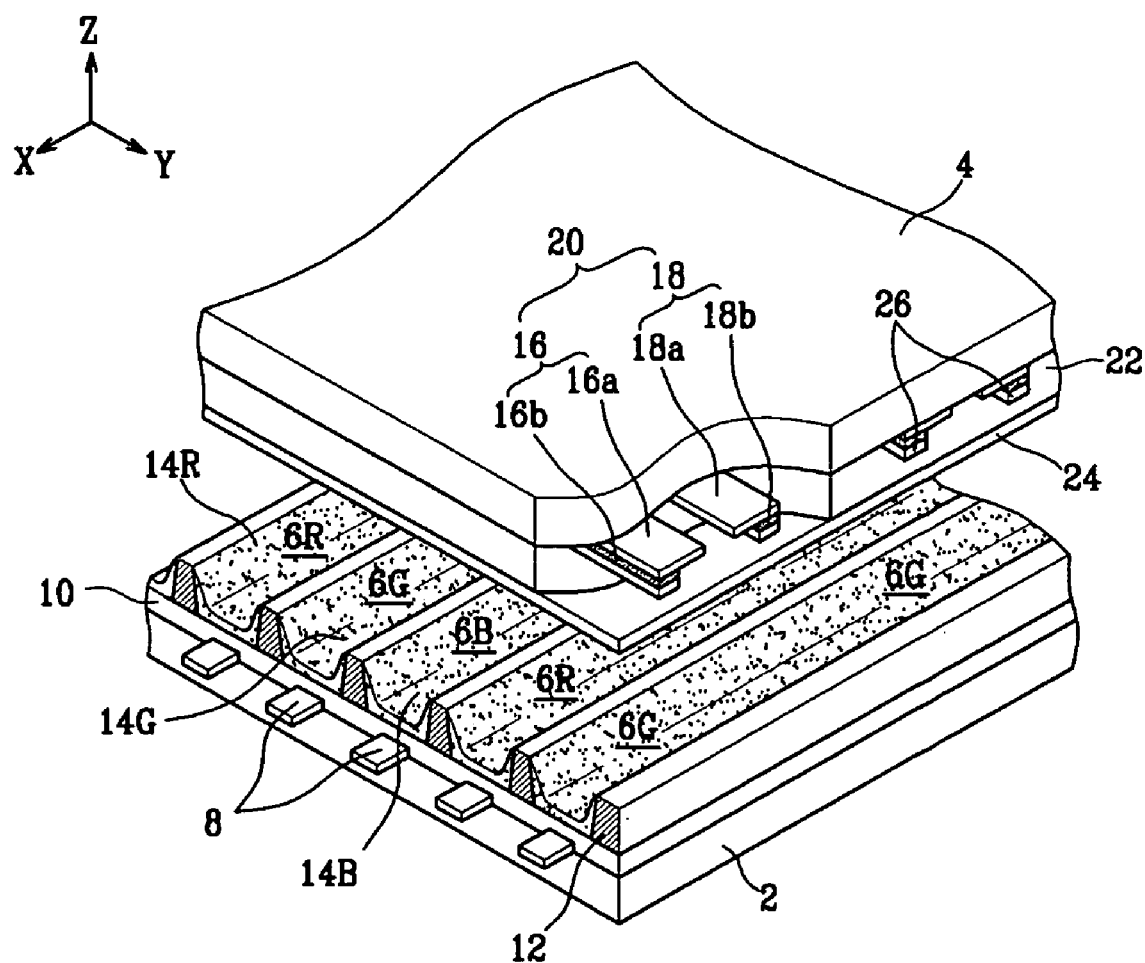
FIG. 1 is a partial exploded perspective view of a PDP according to the present invention.
Figure 2:
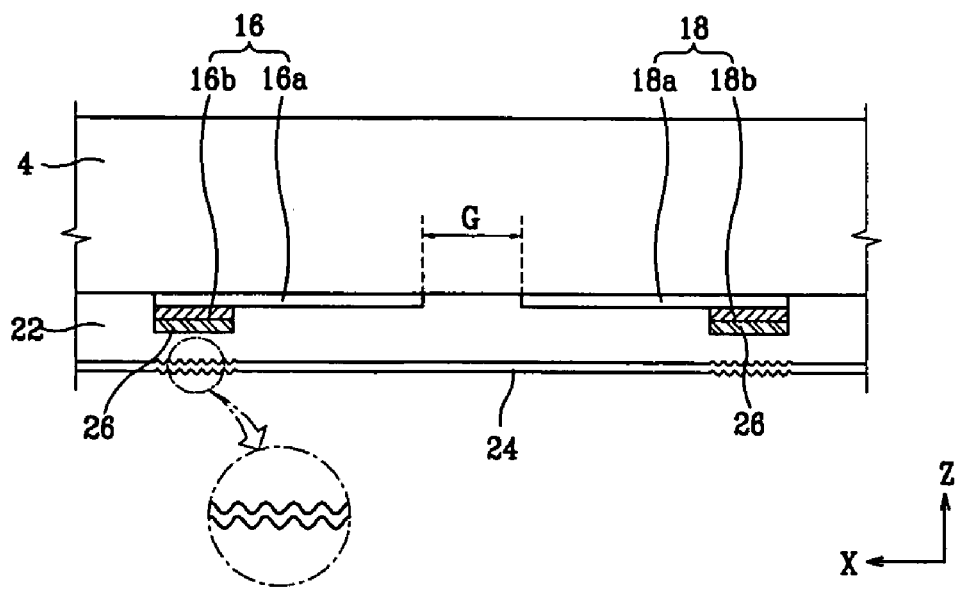
FIG. 2 is a partial sectional view of a second substrate of the PDP shown in FIG. 1.

FIG. 1 is a partial exploded perspective view of a PDP according to the present invention, and FIG. 2 is a partial sectional view of a second substrate shown in FIG. 1.

As shown in FIG. 1 and FIG. 2, a first substrate 2 faces a second substrate 4 and is separated from it by a predetermined distance. The first and second substrates 2, 4 have discharge cells 6R, 6G, 6B therebetween. The discharge cells 6R, 6G, 6B emit visible rays, according to an independent discharge mechanism, to realize color images.

More specifically, a plurality of address electrodes 8, which are covered by a first dielectric layer 10, are formed on the first substrate 2 in one direction (in the direction of the X axis of FIG. 1). The address electrodes 8 may be arranged in patterns such as a striped pattern.

Barrier ribs 12 may be arranged on the first dielectric layer 10 in parallel with the address electrodes 8. The barrier ribs 12 define the areas in which red, green, and blue phosphor layers 14R, 14G, and 14B are coated. However, the barrier ribs 12 are not limited to a striped pattern. Accordingly, they may be arranged in a latticed structure, a closed structure, or another pattern.

Also, a plurality of display electrodes 20 are formed on the surface of the second substrate 4 in a direction (in the direction of the Y axis of FIG. 1) crossing the address electrodes 8. The display electrodes 20 include alternately formed scanning electrodes 16 and sustain electrodes 18.

A transparent, second dielectric layer 22 covers the display electrodes 20, and a protective layer 24, which may be formed of MgO, may cover the second dielectric layer 22.

In an exemplary embodiment of the present invention, the scanning and sustain electrodes 16, 18 are stripe shaped. The scanning and sustain electrodes 16, 18 have transparent electrodes $16_a$, $18_a$, with a gap G (as shown in FIG. 2) therebetween, and bus electrodes $16_b$, $18_b$, formed on the transparent electrodes 16a, 18a and away from the gap G. Since the bus electrodes $16_b$, $18_b$ may be made from three highly conductive Cr/Cu/Cr film layers or a Ag film, they are capable of compensating for low conductivity of the transparent electrodes $16_a$, $18_a$ made from indium tin oxide (ITO) or other like substances.

When the first substrate 2 is joined with the second substrate 4, portions of a discharge space at intersections of the address electrodes 8 and the display electrodes 20 form discharge cells 6R, 6G, 6B, which are filled with a discharging gas such as a Ne—Xe mixed gas.

In this exemplary embodiment, reinforcing electrodes 26 may be further formed on the second substrate 4. These reinforcing electrodes 26 may enable lengthened sustain discharge paths between display electrodes 20. Further, they may produce wall charges at portions of the first dielectric layer 22 corresponding to both sides of the discharge cells 6R, 6G, 6B, thereby enhancing discharge efficiency.

The reinforcing electrodes 26 may comprise carbon nanotubes (CNT), graphite, other carbon-based materials, or a combination thereof. In this exemplary embodiment, the reinforcing electrodes 26 comprise a carbon nanotube layer. Carbon nanotubes may act as electron emission sources in applied electrical fields because they have high electrical conductivity and a microscopic structure with nanometer-size diameters and radii of curvature. For instance, an Ag bus electrode has a thermal conductivity of 0.77 cal/cm/S, and a carbon nanotube reinforcing electrode has a thermal conductivity of 0.92 cal/cm/S, which approximates that of Cu.

The reinforcing electrodes 26 may be disposed on the bus electrodes 16b, 18b, and like the display electrodes 20, they may be covered by the second dielectric layer 22 and the MgO protective layer 24. The reinforcing electrodes 26 may have a rough surface when they comprise the carbon nanotube layer. Therefore, as shown in FIG. 2, a portion of a lower surface of the second dielectric layer 22 and the MgO protective layer 24, corresponding to each reinforcing electrode 26, may also have a rough surface. The portion of the lower surface of the second dielectric layer 22 may have a surface roughness of about 300 nm to 700 nm, and the portion of the lower surface of the MgO protective layer 24 may have a surface roughness of about 100 nm to 300 nm. Consequently, since the second dielectric layer 22 may have a different surface roughness than the MgO protective layer 24, the discharge cells 6R, 6G, 6B may have a secondary high electron emission coefficient. The reinforcing electrodes 26 may also have a stacked, multilayered structure.

The above PDP, structured according to an exemplary embodiment of the present invention, provides different sustain discharge paths and wall charge distribution curve than a conventional PDP.

Figure 3:
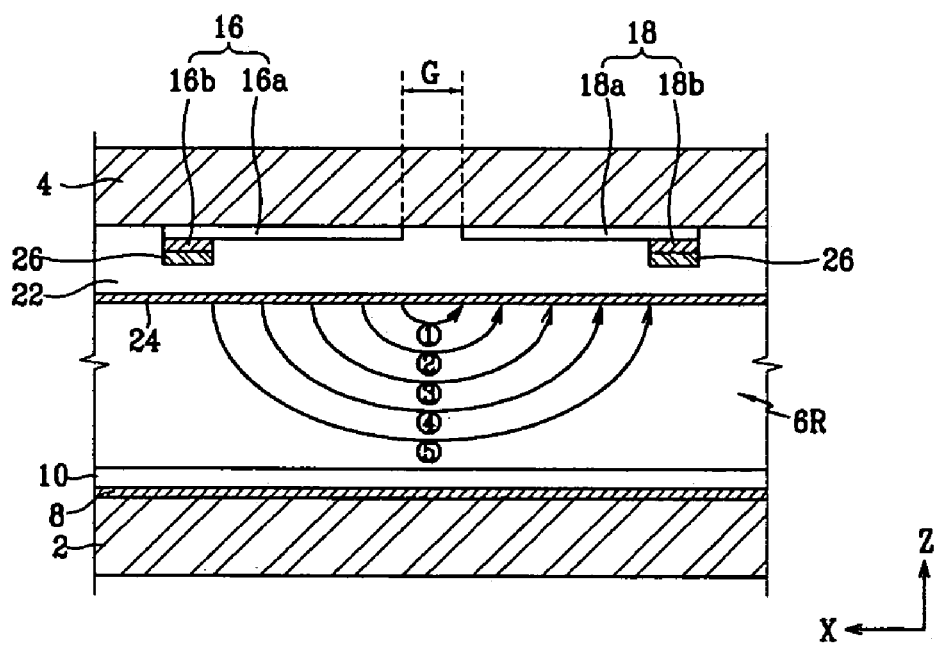
FIG. 3 is a partial sectional view showing discharge paths of a PDP according to the present invention.
Figure 4:
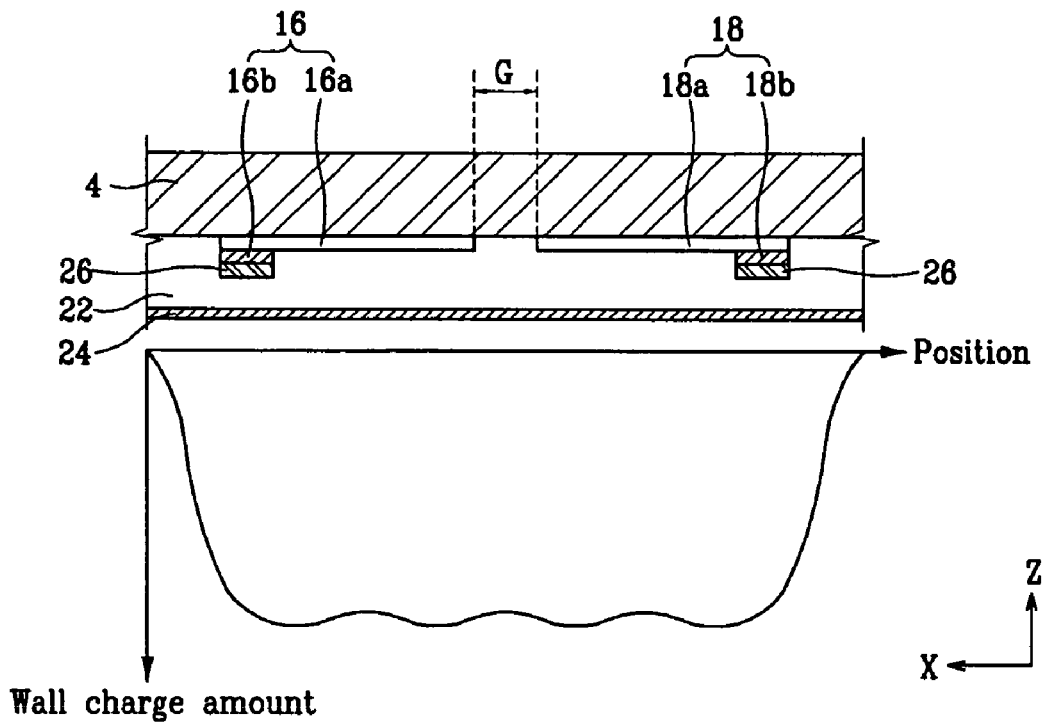
FIG. 4 is a wall charge distribution curve of a PDP according to the present invention.

FIG. 3 is a partial sectional view showing discharge paths of a PDP according to an exemplary embodiment of the present invention, and FIG. 4 is a wall charge distribution curve of a PDP according to an exemplary embodiment of the present invention.

Referring to FIG. 3, plasma discharge begins at the gap G between the display electrodes 20 and gradually spreads into both sides of the gap G (in the direction of the X axis of the FIG. 3). The reinforcing electrodes 26 may enable the plasma discharge intensity to be evenly maintained under the display electrodes 20 (in the direction of the X axis of FIG. 3), so that the plasma discharge may spread into the paths ①, ②, ③, ④ and ⑤. As a result, wit above-structured PDP, the discharge paths lengthen and to efficiently use the second dielectric layer 22 and the interior space of the discharge cells.

Referring to the wall charge distribution curve shown in FIG. 4, unlike conventional wall charge distribution, substantially uniform wall charges may accumulate on the second dielectric layer 22 throughout the interior space of the discharge cells 6R, 6G, 6B. Further, the amount of accumulated wall charges may exceed that of the conventional PDP. Accordingly, the PDP's discharge efficiency may increase while the driving voltage decreases.

The first through fifth exemplary embodiments of the present invention will be described more fully hereinafter with reference to FIG. 5, FIG. 6, FIG. 7, FIG. 8 and FIG. 9. Since the PDPs according to the first through fifth exemplary embodiments have substantially the same structure as that of FIG. 1 and FIG. 2, descriptions of the same composing elements will not be given.

Figure 5:
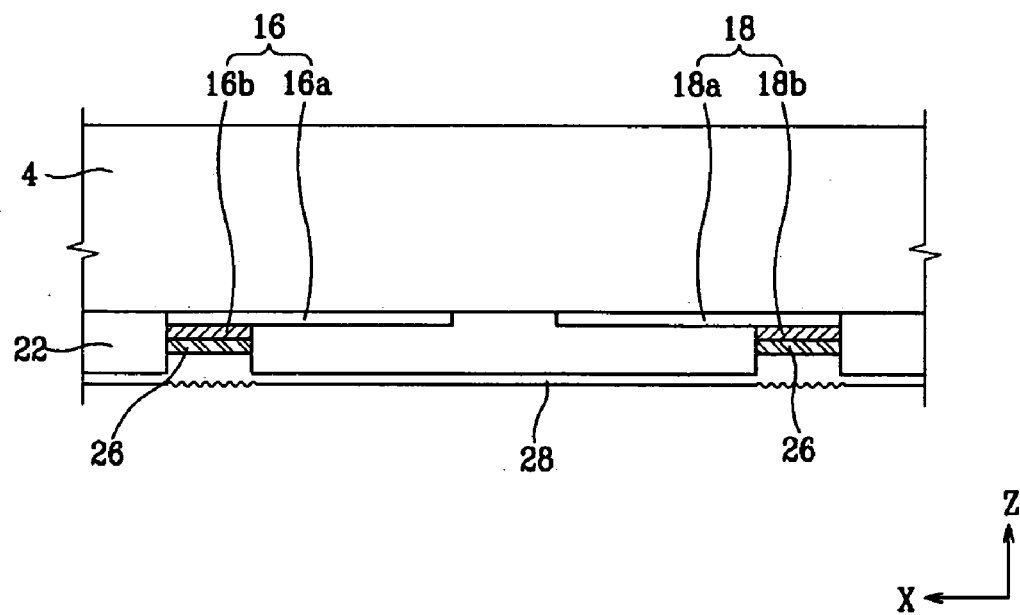
FIG. 5 is a partial sectional view of a second substrate according to a first exemplary embodiment of the present invention.

FIG. 5 shows the first exemplary embodiment of the present invention. As shown in FIG. 5, the second dielectric layer 22 may be formed with openings exposing the reinforcing electrodes 26. Accordingly, a MgO protective layer 28 may be directly coated on the second dielectric layer 22 and on the reinforcing electrodes 26. When the MgO protective layer 28 is coated on the reinforcing electrodes 26 comprising a carbon nanotube layer or other like materials, a portion of a lower surface of the protective layer corresponding to the reinforcing electrodes 26 may have a surface roughness of about 300 nm to about 700 nm. With this structure, the reinforcing electrodes 26 may have a greater affect on the discharge cell, because the MgO protective layer 28 may have a higher surface roughness at portions corresponding to the reinforcing electrodes 26, thereby enhancing the secondary electron emission coefficient.

Figure 6:
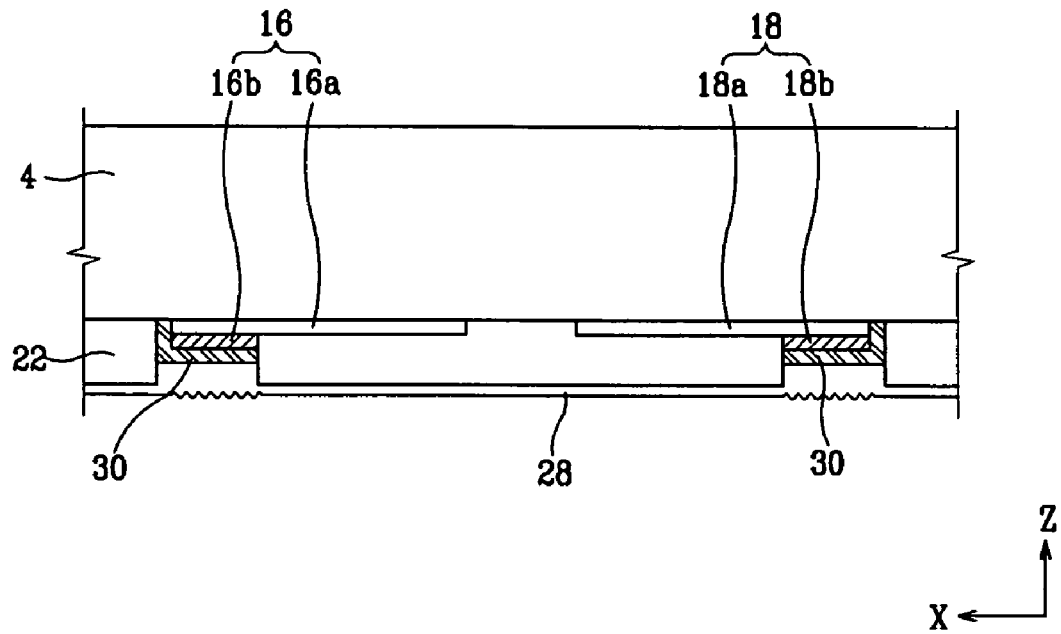
FIG. 6 is a partial sectional view of a second substrate according to a second exemplary embodiment of the present invention.

FIG. 6 shows the second exemplary embodiment of the present invention. As shown in FIG. 6, reinforcing electrodes 30 may comprise a first reinforcing electrode portion formed on the bus electrodes 16b, 18b and a second reinforcing electrode portion arranged longitudinally from a side surface of the transparent electrodes 16a, 18a to a side surface of the bus electrodes 16b, 18b. In other words, the first and second reinforcing electrode portions may be formed as an L-shaped reinforcing electrode 30.

With this structure, the reinforcing electrodes 30 may enhance the intensity of the electric field in the far interior space of the discharge cell away from the display electrodes 20, thereby enhancing the discharge efficiency.

Figure 7:
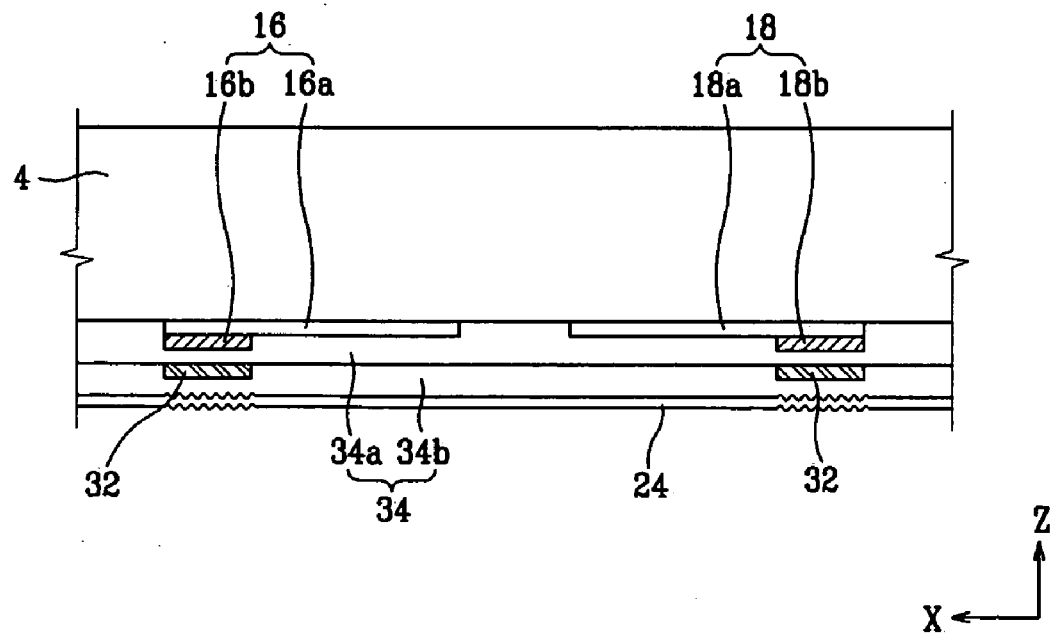
FIG. 7 is a partial sectional view of a second substrate according to a third exemplary embodiment of the present invention.

FIG. 7 shows the third exemplary embodiment of the present invention. As shown in FIG. 7, the display electrodes 20 may be disposed on the second substrate 4 and covered by a first dielectric layer 34a. Reinforcing electrodes 32 may be disposed on a portion of the first dielectric layer 34a, corresponding to the bus electrodes 16b, 18b, and covered by a second dielectric layer 34b. Therefore, the first dielectric layer 34a is interposed between the bus electrodes 16b, 18b and the reinforcing electrodes 32. The MgO protective layer 24 may be disposed on the second dielectric layer 24.

With this structure, the reinforcing electrodes 32 may act as floating electrodes to which voltage may not be externally applied, but which are capacitively coupled to the bus electrodes 16b, 18b. A floating electrode may be defined as an excited potential electrode that allows a priming particle in the discharge cell to float. That is, such an electrode may provide reduced phosphor deterioration, a low driving voltage, and high speed addressing.

Figure 8:
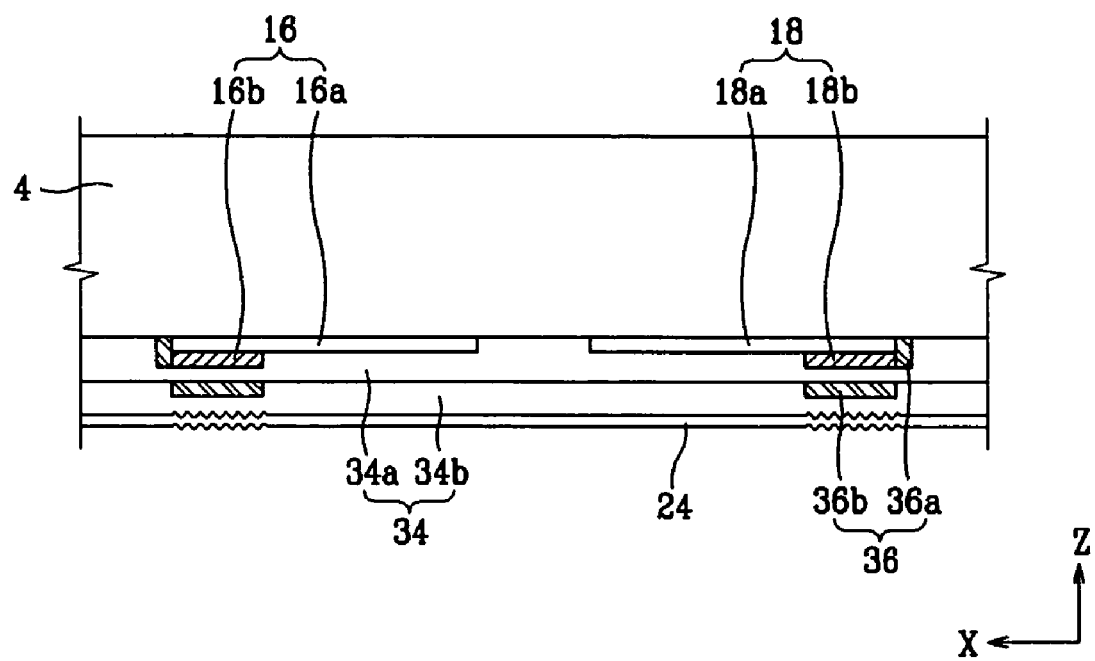
FIG. 8 is a partial sectional view of a second substrate according to a fourth exemplary embodiment of the present invention.

FIG. 8 shows the fourth exemplary embodiment of the present invention. As shown in FIG. 8, reinforcing electrodes 36 may comprise a first reinforcing electrode 36a extended along a side surface of the transparent electrodes 16a, 18a to a side surface of the bus electrodes 16b, 18b, and a second reinforcing electrode 36b formed on the first dielectric layer 34a, which is interposed between the bus electrodes 16b, 18b, and the second reinforcing electrode 36b. The second reinforcing electrode 36b is formed at a portion of the first dielectric layer 34a corresponding to the bus electrodes 16b, 18b, which may increase the electric intensity at the periphery of the discharge cell's interior space.

Figure 9:
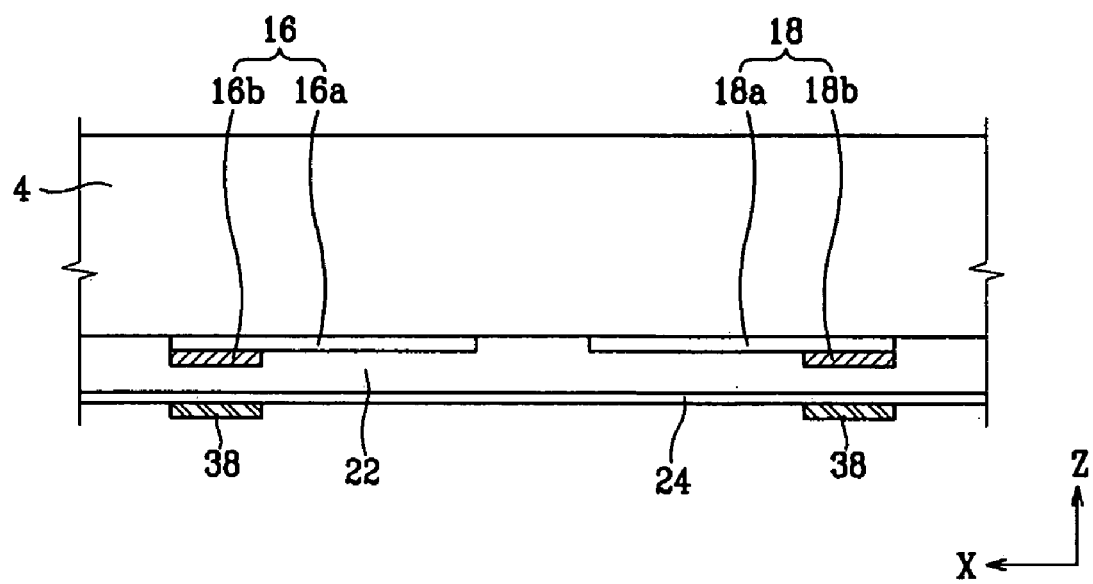
FIG. 9 is a partial sectional view of a second substrate according to a fifth exemplary embodiment of the present invention.

FIG. 9 shows the fifth exemplary embodiment of the present invention. As shown in FIG. 9, a dielectric layer 22 covers the display electrodes 20, and an MgO protective layer 24 covers the dielectric layer 22. Reinforcing electrodes 38 may be disposed on a portion of the MgO protective layer 24 corresponding to the bus electrodes 16b, 18b. With this structure, the reinforcing electrodes 38 may be provided in the interior space of the discharge cell to enhance the secondary electron emission coefficient and wall charge efficiency.

Figure 10:
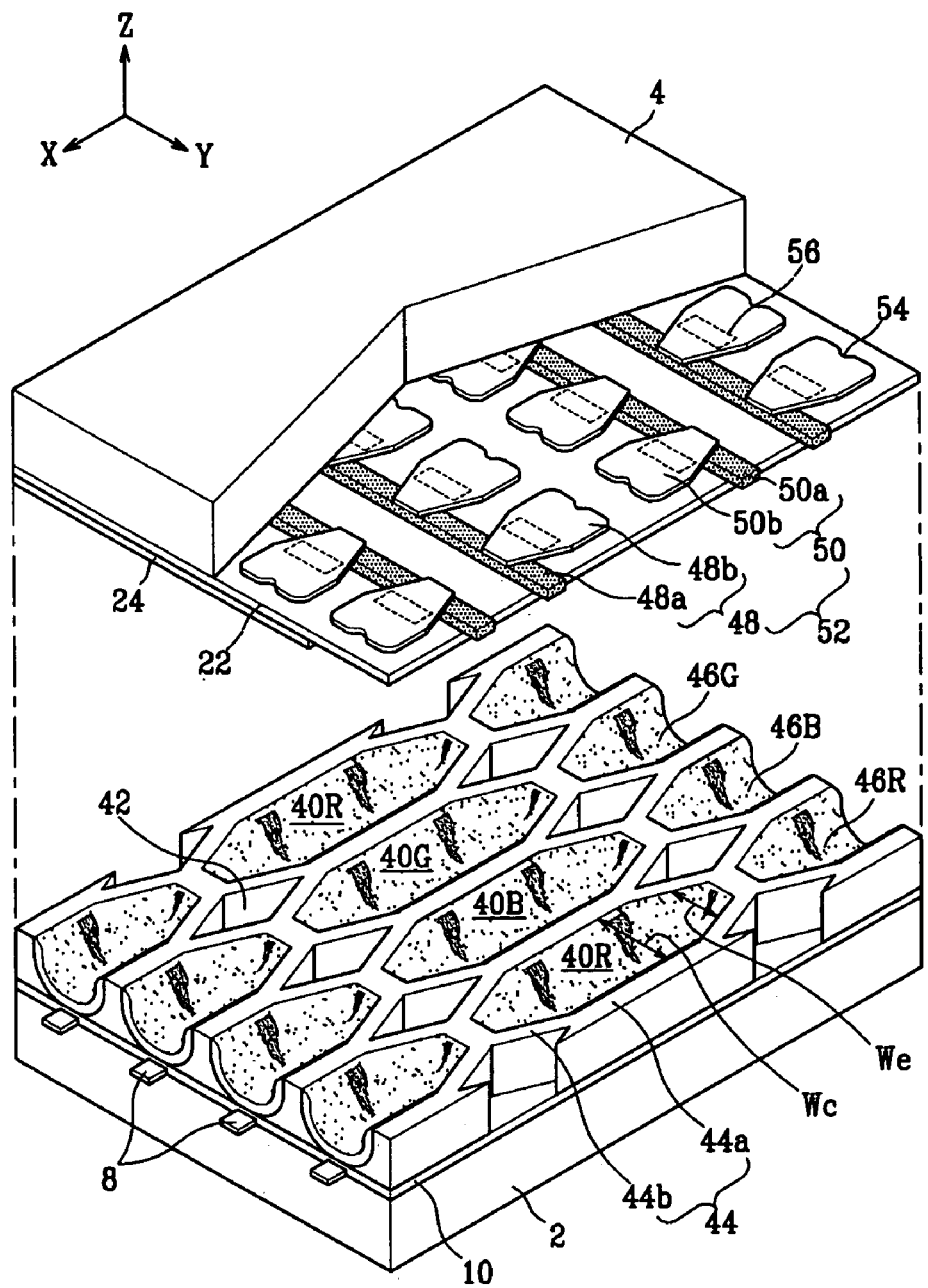
FIG. 10 is a partial exploded perspective view of a PDP according to a sixth exemplary embodiment of the present invention.

Now, a sixth exemplary embodiment of the present invention will be explained with reference to FIG. 10, FIG. 11 and FIG. 12. FIG. 10 is a partial exploded perspective view of a PDP according to the sixth exemplary embodiment of the present invention, FIG. 11 is a schematic plan view of FIG. 10, and FIG. 12 is a partial sectional view of a second substrate shown in FIG. 10.

Figure 11:
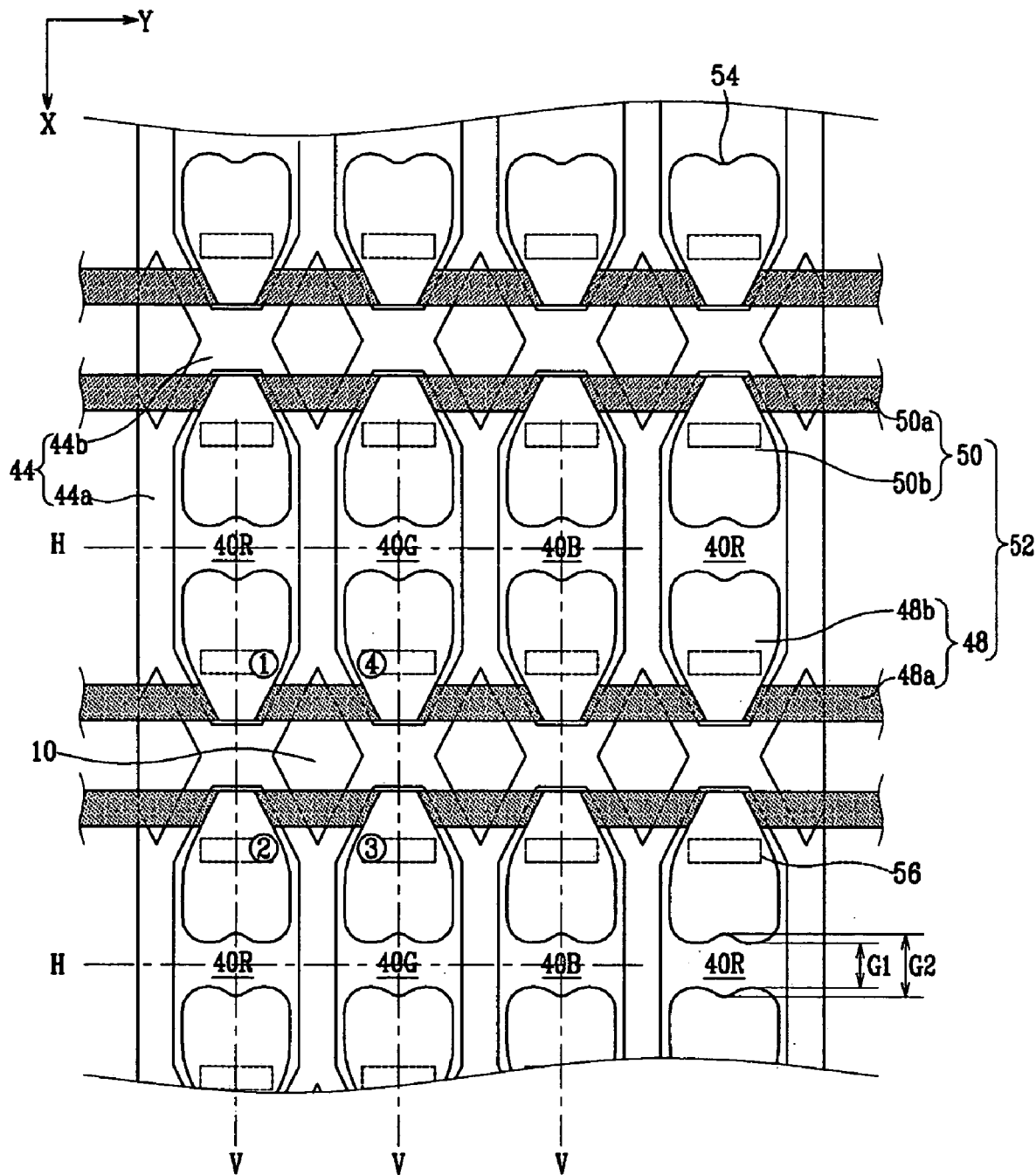
FIG. 11 is a schematic plan view of FIG. 10.
Figure 12:
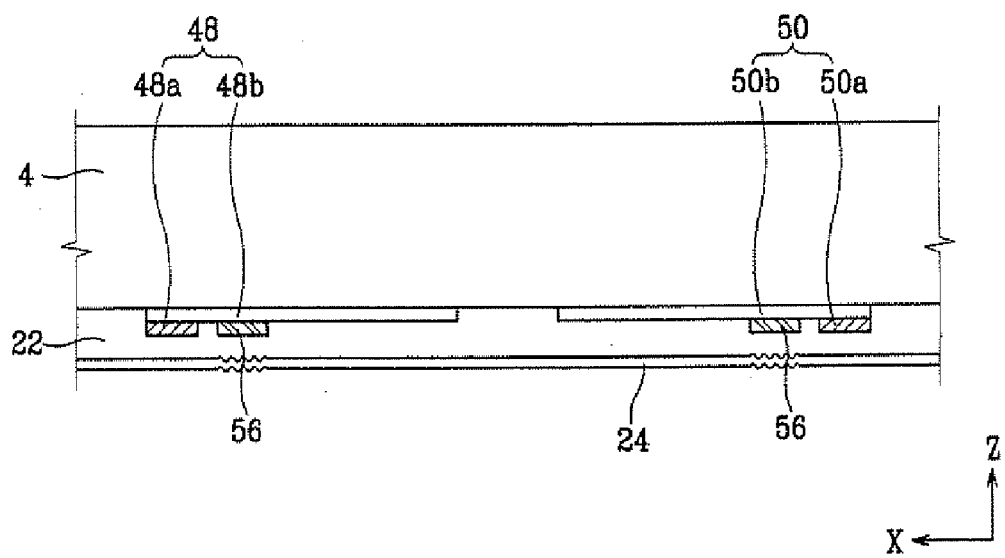
FIG. 12 is a partial sectional view of a second substrate of FIG. 10.
Figure 13:
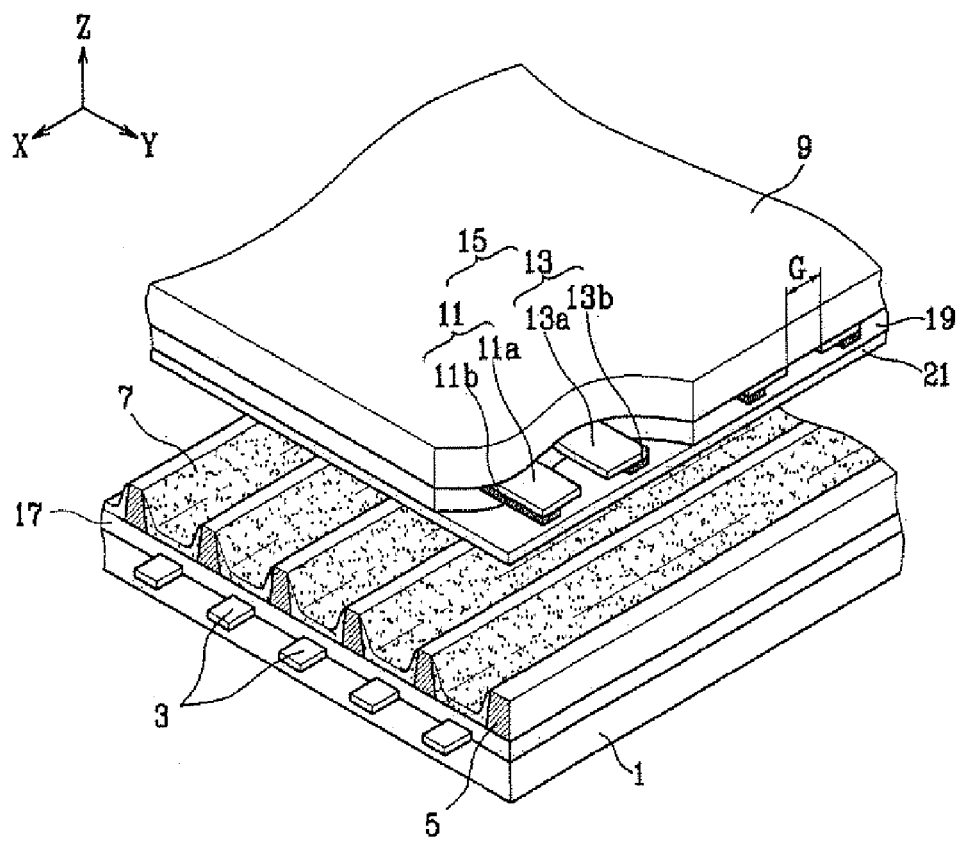
FIG. 13 is a partial exploded perspective view of a conventional PDP.
Figure 14:
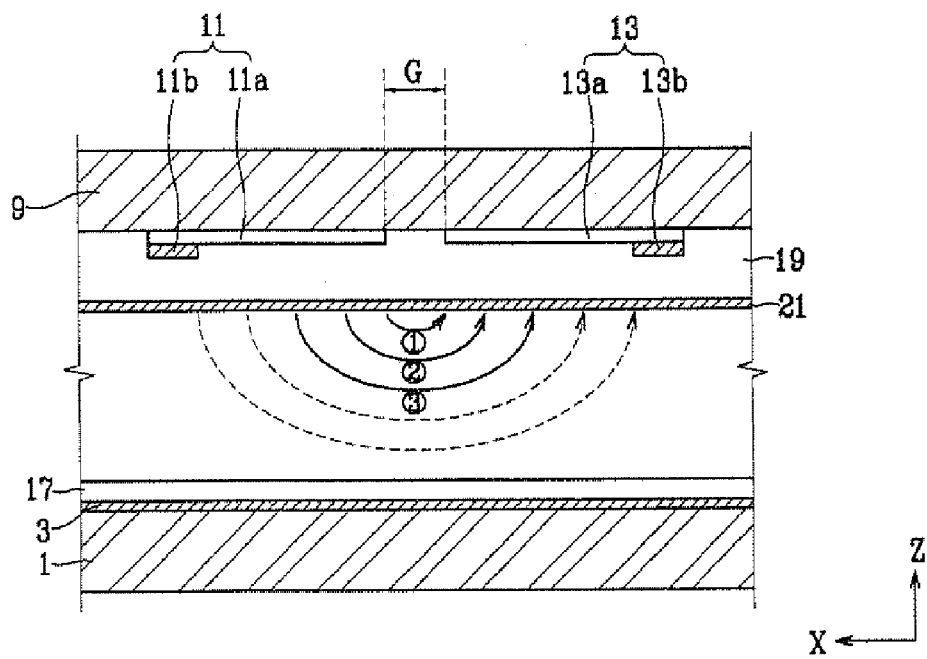
FIG. 14 is a partial sectional view showing discharge paths of a conventional PDP.
Figure 15:
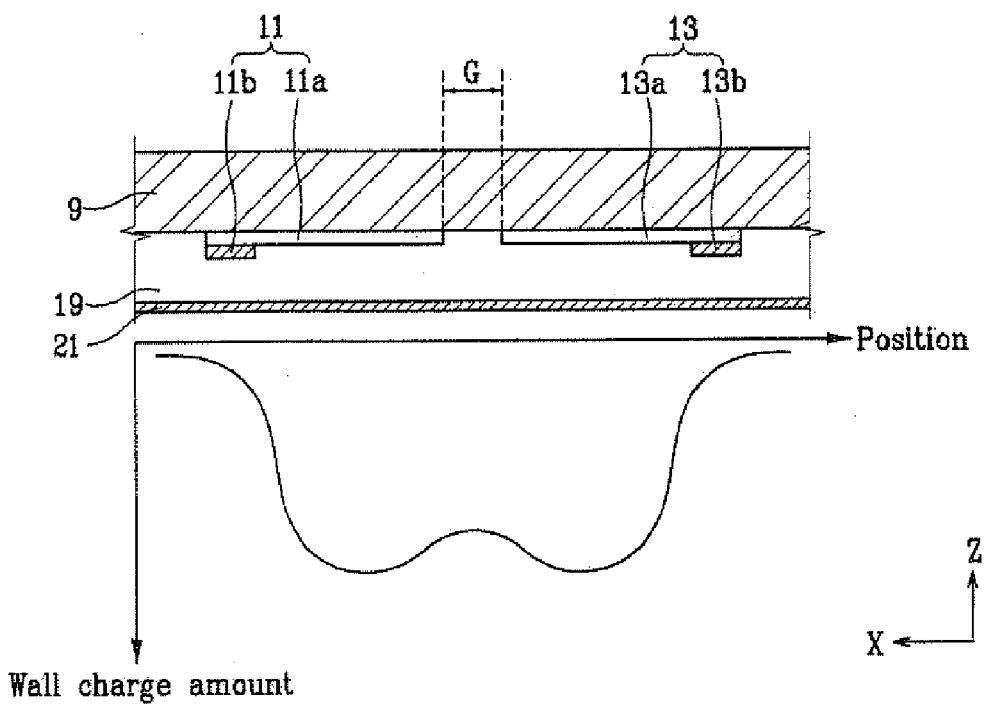
FIG. 15 is a wall charge distribution curve of a conventional PDP.

Referring to FIG. 10, FIG. 11, and FIG. 12, a PDP is provided with discharge cells 40R, 40G, 40B and non-discharge regions 42 between the first and second substrates 2, 4. The discharge cells 40R, 40G, 40B are areas where gas discharge and illumination are expected to take place. The non-discharge regions 42 are areas where gas discharge and illumination are not expected to take place.

Barrier ribs 44 may be formed in a cross pattern along the direction of the address electrodes 8 (in the direction of the X axis of FIG. 10) and the direction crossing it (in the direction of the Y axis of FIG. 10). Each discharge cell 40R, 40G, 40B is formed considering a spread shape of the plasma discharge. In other words, the discharge cells 40R, 40G, 40B may be formed such that the area that most substantially contributes to discharge and brightness may be the largest area of the cell. For instance, since discharge cells 40R, 40G, 40B may be formed having a width that gradually decreases from the center to both sides thereof, they may have a minimum width $W_e$ at both sides along the Y direction, and a maximum width $W_c$ at the center. In FIG. 10, the discharge cells 40R, 40G, 40B form a honeycomb-like structure.

As shown in FIG. 11, assuming a pseudo-horizontal axis H and a vertical axis V pass through the center of the discharge cells 40R, 40G, 40B, the non-discharge regions 42 may be arranged at positions surrounded by a pair of horizontal axes H and vertical axes V. Therefore, one non-discharge region 42 is positioned at a center of four discharge cells ①, ②, ③, ④, which comprise a pair of adjacent discharge cells along two adjacent horizontal axes H, and a pair of adjacent discharge cells along two adjacent vertical axes V. With this structure, the non-discharge region 42 may absorb heat emitted from the surrounding discharge cells 40R, 40G, 40B, which may enhance the PDP's heat dissipating characteristic.

Barrier ribs 44 defining the discharge cells 40R, 40G, 40B comprise first barrier rib members 44a, which may be formed in parallel with the address electrodes 8, and second barrier rib members 44b, which may be formed at an angle to the first barrier rib members 44a. For example, the first and second barrier rib members 44a, 44b may be arranged in an X-shaped pattern. The discharge cells 40R, 40G, 40B may be lined with red, green, and blue phosphor layers 46R, 46G, 46B, respectively.

The display electrodes 52 may be formed on the second substrate 4 along the direction (Y axis direction of FIG. 11) crossing the address electrodes 8. The display electrodes 52 may comprise scanning electrodes 48 and sustain electrodes 50, and the second dielectric layer 22 and the MgO protective layer 24 may be sequentially disposed on the second substrate 4 to cover the display electrodes 52. In this exemplary embodiment, the scanning electrodes 48 and sustain electrodes 50 may be formed with bus electrodes 48a, 50a, which may be arranged at both sides of discharge cells 40R, 40G, 40B, and projected transparent electrodes 48b, 50b, which may extend from the bus electrodes 48a, 50a toward the center of the discharge cell 40R, 40G, 40B.

The projected transparent electrodes 48b, 50b may have a maximum width near the center of the discharge cell 40R, 40G, 40B, and a minimum width near both sides thereof. Therefore, the projected transparent electrodes 48b, 50b may be formed corresponding to a shape of the discharge cells 40R, 40G, 40B. Also, the distal end of the projected transparent electrodes 48b, 50b may have a recess 54 at a center of the portion having the maximum width. Accordingly, a shorter gap G1 and a longer gap G2, formed between a pair of projected transparent electrodes 48b, 50b, may be used to ignite discharging at both sides of the discharge cells 40R, 40G, 40B.

Reinforcing electrodes 56 may be formed on a portion of the second substrate 4, corresponding to both sides of the discharge cells 40R, 40G, 40B, along the direction of the Y axis. In this exemplary embodiment, the reinforcing electrodes 56 are disposed on the projected transparent electrodes 48b, 50b and closer to a center of the discharge cells 40R, 40G, 40B than the bus electrodes 48a, 50a. The reinforcing electrodes 56 are disposed on the same plane along with the bus electrodes 48a, 50a, with a predetermined interval therebetween.

The operating process of a PDP according to exemplary embodiments of the present invention will be briefly described hereinafter.

First, in FIG. 10, when a sustain voltage Vs is applied across the scanning and sustain electrodes 48, 50 of selected discharge cells 40R, 40G, 40B, a sustain discharge may be ignited at the shorter gap G1, corresponding to the periphery of the discharge cells 40R, 40G, 40B, and gradually spread around the shorter gap G1. Next, a discharge may be ignited at the longer gap G2, corresponding to the center of the discharge cell 40R, 40G, 40B, and gradually spread around the longer gap G2. As a result, the initial discharges may be ignited intensively over the entire interior space of the discharge cells, thereby enhancing discharge efficiency and an ability to drive at a low voltage.

Also, the reinforcing electrodes 56 may be positioned at both sides of the discharge cells 40R, 40G, 40B to lengthen the discharge paths.

This structure may enhance discharge efficiency, thereby increasing the screen brightness and PDP efficiency (ratio of brightness relative to power consumption).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A plasma display panel (PDP), comprising:
   a first substrate and a second substrate;
   address electrodes formed on the first substrate;
   barrier ribs arranged between the first substrate and the second substrate;
   a pair of display electrodes formed in parallel to each other on the second substrate in a direction crossing the address electrodes, each display electrode comprising a bus electrode and a transparent electrode; and
   reinforcing electrodes arranged at both ends of a discharge cell along a direction the address electrodes are formed, the reinforcing electrodes being separated from and arranged between the bus electrodes of the discharge cell,
   wherein the reinforcing electrodes are coupled to the display electrodes;
   wherein the barrier ribs define discharge cells and non-discharge regions;
   wherein a non-discharge region is surrounded by discharge cells.

2. The PDP of claim 1, wherein a non-discharge region is positioned within an area defined by two adjacent discharge cell abscissas that each pass through centers of a pair of adjacent discharge cells and two adjacent discharge cell ordinates that each pass through the centers of a pair of adjacent discharge cells.

3. The PDP of claim 1, wherein the discharge cells are widest at their center and narrowest at their ends.

4. A plasma display panel (PDP), comprising:
a first substrate and a second substrate;
address electrodes formed on the first substrate;
barrier ribs arranged between the first substrate and the second substrate;
a pair of display electrodes formed in parallel to each other on the second substrate in a direction crossing the address electrodes; and
reinforcing electrodes arranged at both ends of a discharge cell along a direction the address electrodes are formed,
wherein the reinforcing electrodes are coupled to the display electrodes;
wherein the display electrodes comprise protrusion electrodes having a maximum width at a center of the discharge cell and a minimum width at both ends of the discharge cell;
wherein the maximum width of the protrusion electrodes occurs at distal ends of the protrusion electrodes; and
wherein the distal ends are formed having a recessed portion at their center.

5. The PDP of claim 4, wherein the reinforcing electrodes are separately arranged on a same plane as bus electrode portions of the display electrodes.

* * * * *